(12) United States Patent
Dupuis

(10) Patent No.: US 9,831,655 B2
(45) Date of Patent: Nov. 28, 2017

(54) ENCLOSURE FOR A CABLE CONNECTION

(71) Applicant: 3M INNOVATIVE PROPERTIES COMPANY, St. Paul, MN (US)

(72) Inventor: David M. Dupuis, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/105,624

(22) PCT Filed: Jan. 16, 2015

(86) PCT No.: PCT/US2015/011682
§ 371 (c)(1),
(2) Date: Jun. 17, 2016

(87) PCT Pub. No.: WO2015/112435
PCT Pub. Date: Jul. 30, 2015

(65) Prior Publication Data
US 2017/0033546 A1 Feb. 2, 2017

Related U.S. Application Data

(60) Provisional application No. 61/930,033, filed on Jan. 22, 2014.

(51) Int. Cl.
*H02G 3/00* (2006.01)
*H02G 15/113* (2006.01)

(52) U.S. Cl.
CPC ................... *H02G 15/113* (2013.01)

(58) Field of Classification Search
CPC .... H02G 15/113; H02G 15/103; H02G 15/22; H02G 15/23; H02G 15/10; H02G 15/08;
(Continued)

(56) References Cited

U.S. PATENT DOCUMENTS

| | | | | |
|---|---|---|---|---|
| 5,594,210 A | * | 1/1997 | Yabe ........................ | H01R 4/70 174/76 |
| 6,283,670 B1 | * | 9/2001 | Blankinship ......... | H02G 15/113 174/92 |

(Continued)

FOREIGN PATENT DOCUMENTS

| EP | 0 156 441 A2 | 10/1985 |
|---|---|---|
| EP | 0314451 | 5/1989 |

(Continued)

OTHER PUBLICATIONS

International Search Report for PCT Appl. No. PCT/US2015/011682 dated Apr. 29, 2015, 4 pp.
(Continued)

*Primary Examiner* — Angel R Estrada
(74) *Attorney, Agent, or Firm* — Janet A. Kling

(57) ABSTRACT

The present invention is directed to an enclosure for protecting a cable connection. The enclosure includes an unsupported sheet sealing member contained within an inner shell and an exoskeleton. The inner shell defines a central axis for the enclosure. The sheet sealing member is attached along two longitudinal edges of the inner shell and wherein the rigid exoskeleton is configured to snap onto the inner shell in a direction transverse to the central axis to secure the enclosure around the cable connection.

20 Claims, 7 Drawing Sheets

(58) Field of Classification Search
CPC ........ H02G 15/18; H01B 17/02; H01B 17/00;
H01B 17/005; H01R 4/70; H01R 4/00
USPC .... 174/72 A, 74 A, 93, 77 R, 70 C, 135, 92,
174/70 R
See application file for complete search history.

(56) References Cited

U.S. PATENT DOCUMENTS

| | | | |
|---|---|---|---|
| 6,864,427 B2 * | 3/2005 | Radelet .................. | H02G 15/18 174/93 |
| 6,955,558 B1 * | 10/2005 | Low ..................... | H02G 15/013 439/467 |
| 7,093,858 B1 | 8/2006 | Russell | |
| 7,282,644 B1 * | 10/2007 | Alvey ..................... | H01R 4/70 174/84 R |
| 7,304,242 B1 * | 12/2007 | Dower ............... | H02G 15/1833 174/74 R |
| 7,307,219 B1 | 12/2007 | Dower et al. | |
| 7,531,748 B2 * | 5/2009 | Dower .................. | H02G 15/18 174/93 |
| 7,690,940 B1 * | 4/2010 | Burr .................... | H01R 13/639 439/367 |
| 8,378,214 B2 * | 2/2013 | Ambo .................... | H01R 4/70 174/72 A |
| 8,841,553 B2 * | 9/2014 | Dower .................. | H02G 15/18 174/92 |
| 2002/0166691 A1 | 11/2002 | Yaworski et al. | |
| 2008/0245547 A1 | 10/2008 | Low et al. | |
| 2012/0090876 A1 | 4/2012 | Dower et al. | |

FOREIGN PATENT DOCUMENTS

| | | |
|---|---|---|
| EP | 1981140 | 10/2008 |
| GB | 2 296 393 A | 6/1996 |
| WO | 2011/162926 | 12/2011 |
| WO | 2012-038854 | 3/2012 |

OTHER PUBLICATIONS

Supplementary European Search Report for EP Appl. No. 15740179.5, dated Jul. 4, 2017, 3 pp.

* cited by examiner

ENCLOSURE FOR A CABLE CONNECTION

FIELD OF THE INVENTION

The present invention relates to an enclosure to protect a connection between two cables, or the connection between a cable and a housing. In particular, the present invention relates to an enclosure having a sealing member contained within an inner shell wherein the sealing member is secured around the cable connection by engaging a removable exoskeleton over the inner shell to ensure a reliable environmental seal for the cable connection.

BACKGROUND

Telecommunication cables are ubiquitous and used for distributing all manner of data across vast networks. As telecommunication cables are routed across data networks, it is necessary to periodically connect the cable to other cables or equipment.

At each point where a cable connection is made, it may be necessary to provide protection for the cable connection and to protect the cable interfaces from environmental contaminants. This can be accomplished by wrapping the cable connection in a tape or mastic and/or placing the cable connection in a protective enclosure. Commonly, the enclosure has one or more ports through which cables can enter and/or exit the enclosure. Once the cables are routed into the enclosure, the cable connections can be made.

Typical enclosures for the telecommunications market provide mechanical and/or environmental protection for cable connections. The cable can, for example, be a telecommunications cable, a power cable, an optical fiber cable, coaxial cable, or any other type of cable. The cable connection can be made via a conventional splice or a connector and may require protection from the effects of the environment in which it is located and, more particularly, benefits from protection against mechanical impact and the entry of moisture, dirt, salt, acid rain, or other environmental contaminants.

Many different types of enclosures providing different levels of protection for cable splices are commercially available, including so-called re-enterable enclosures that can be re-opened to permit access to the splice whenever required. These conventional telecommunication enclosures are often employed to protect a plurality of twisted pair copper splices and/or fiber optic connections in the outside plant telecommunications market. These closures can be relatively large and bulky and are not well suited to applications requiring a single closure to protect a single connection point between two or more communication cables, between a cable and a housing (e.g. a cabinet, a bulkhead, a larger enclosure or housing for a piece of equipment) or between a cable and a piece of equipment, especially when the cable connections are densely placed or ganged connections such as one might find in cell tower installations. Thus, a need exists for a smaller, more craft friendly enclosure which will fit in tight spaces and which has improved workability in the field.

SUMMARY

The present invention is directed to an enclosure for protecting a cable connection. The enclosure includes an unsupported sheet sealing member contained within an inner shell and an exoskeleton. The inner shell defines a central axis for the enclosure. The sheet sealing member is attached along two longitudinal edges of the inner shell and wherein the rigid exoskeleton is configured to snap onto the inner shell in a direction transverse to the central axis to secure the HI enclosure around the cable connection.

BRIEF DESCRIPTION OF THE DRAWINGS

The present invention will be further described with reference to the accompanying drawings wherein like reference numerals refer to like parts in the several views, and wherein.

Figure 1A:
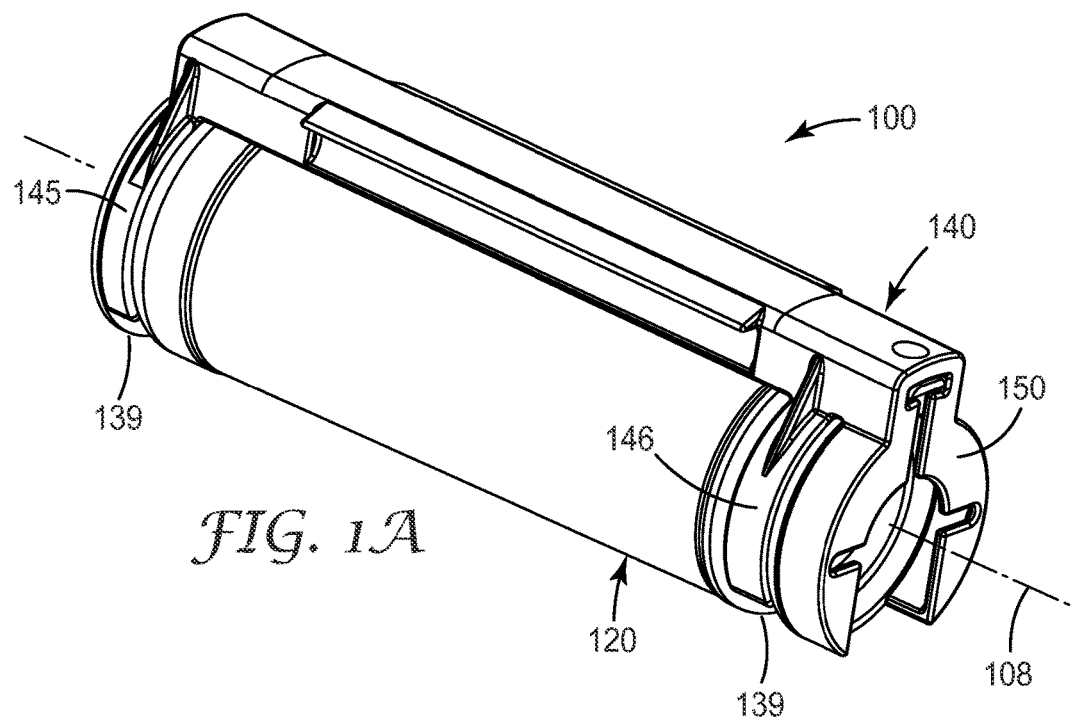
FIGS. 1A-1D show four views of an exemplary enclosure according to an embodiment of the present invention.

While the invention is amenable to various modifications and alternative forms, specifics thereof have been shown by way of the drawings and will be described herein in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "forward," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The present invention relates to an exemplary enclosure to protect a connection between two or more cables, or a bulkhead fitting (i.e. connection between a cable and a housing or piece of equipment). In an exemplary aspect, the exemplary connector can be used to provide environmental protection to cellular antenna bulkhead fittings. The exemplary enclosure can also be used to repair the sheath of a cable that has been damaged due to wear and abrasion or as can occur when utility crews are digging around or near buried cables. In yet another aspect, the exemplary enclosure can be used to provide environmental protection at the point where a cable enters duct to prevent contaminants from entering the duct. In an alternative aspect, the exemplary enclosure can protect the junction between a cable and a ground wire.

Many conventional connectors used in the telecommunication, cable TV, telecommunications, agriculture, and public utilities, even those having internal sealing members (i.e. O-rings), do not provide adequate environmental and/or mechanical protection for the cable connection by themselves. Without additional external protection, water and other contaminants can penetrate the system and degrade the electrical or optical connection. To compensate for this shortcoming in the connectors, system operators will frequently place the cable connection in a molded enclosure, encapsulate, or wrap the cable connection with tapes and/or mastics to provide the necessary environmental and mechanical protection.

However, in some applications, where it is desirable to individually protect connections in confined spaces, such as in cellular installations, there can be too little space to accommodate conventional molded enclosures. In some instances operators utilize a process that involves wrapping multiple alternating layers of tape and mastic around and over the connector and the adjacent cabling to provide a measure of environmental protection for the connection. This wrapping process can be a tedious, time consuming operation and its effectiveness is dependent on the skill of the installer. Additionally, when the wrap process is employed in aerial installations such as those that occur high up on cellular towers, the difficulty in properly using these materials is amplified and ultimately affects the safety of the technician. Finally, the tape/mastic wrapping must be cut away during routine inspection and maintenance operations and reapplied when these operations are complete, requiring additional time and expense.

Figure 4:
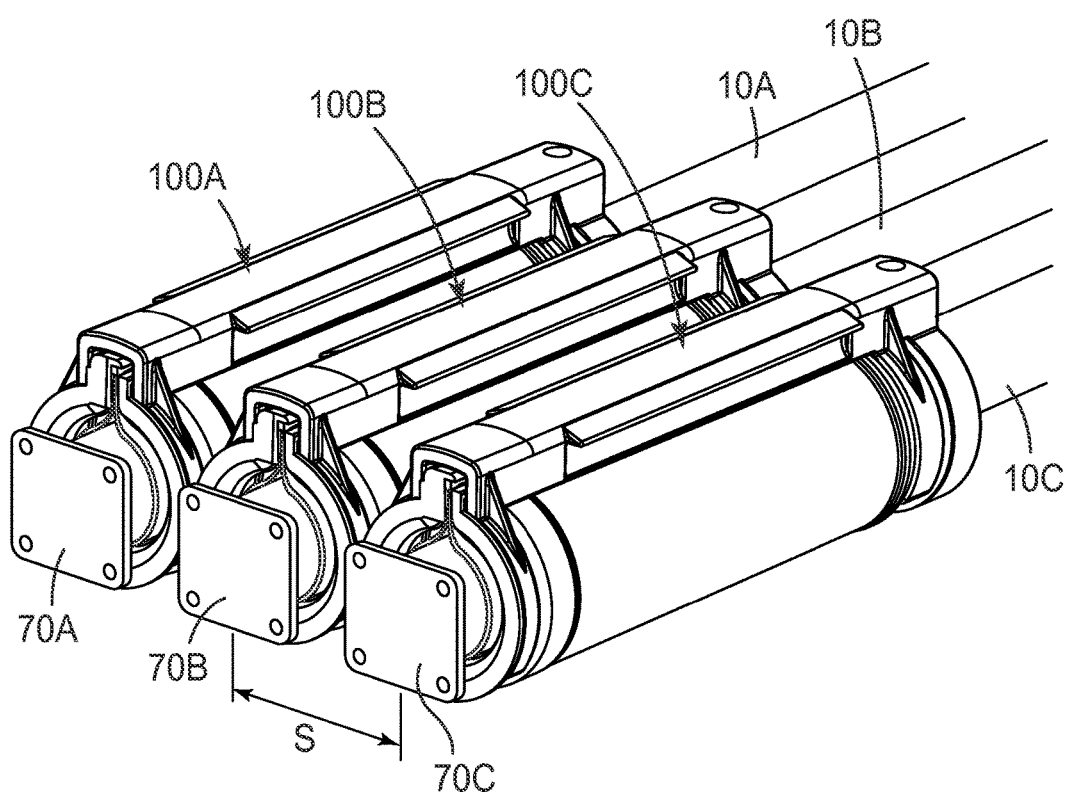
FIG. 4 shows a plurality of exemplary enclosures protecting cable connections.

In addition, the density of cable connections to cellular equipment is increasing driving the use of smaller and smaller connectors that are being placed closer and closer together. Thus, what is needed is a new form of protective enclosure which can be quickly and easily applied around a cable connection in confined spaces (e.g. in spaces which are located less than 50 mm from an obstruction or to protect cable connections that have a center to center spacing, S, of less than 50 mm as shown in FIG. 4), such as closely packed connector arrays found on cellular tower antennas, to replace the cumbersome taping process and more bulky molded plastic enclosures.

A small form factor enclosure 100, as described herein, is of simple construction, and uses comparatively few components to enable easy field assembly, even at difficult or inaccessible locations.

Referring to FIGS. 1A-1D, an exemplary enclosure 100 for protecting a cable connection is illustrated. Enclosure 100 includes three parts: an inner shell 120, a rigid exoskeleton 140, and sealing member 110 which can be disposed within the inner shell.

The inner shell 120 is effectively a holder for sealing member 110. The central axis of the enclosure is defined as a line 108 extending through the center of the closed inner shell. In an exemplary aspect, the sealing member can be an unsupported sheet sealing member attached along at least two longitudinal edges of the inner shell. The inner shell includes "pressure points", which will be described in additional detail below, to ensure adequate sealing at key locations when the inner shell and sealing member are placed around a cable connection.

The exoskeleton 140 can be snapped onto the inner shell in a direction transverse to the central axis of enclosure 100 to secure the enclosure around the cable connection such that the exoskeleton imparts a radial compressive load to the inner shell 120 at a plurality of points along the length of the exemplary enclosure. This radial load presses the sealing member into contact with the cable(s) and connector thereby creating an environmental seal around the cable connection disposed therein. The exoskeleton can be a rigid member that includes a spine 142 having a plurality of arcuate ribs 145, 146 extending from the spine at plurality of points along the length of the spine. The arcuate ribs wrap around the inner shell to apply the proper amount of compression to the inner shell and the sheet sealing member disposed therein. Advantageously, exemplary enclosure 100 can be opened to expose the cable connection for inspection or maintenance and then reinstalled over the connection when the inspection or maintenance is complete. For example, exoskeleton 140 can be removed from the inner shell 120 by applying a removal force in a direction away from the central axis of the enclosure. Once the exoskeleton has been removed, the inner shell can be opened and the sealing member separated to reveal the cable connection.

In an exemplary aspect, the exoskeleton can be tethered to the inner shell to ensure that the exoskeleton cannot be dropped while the inner shell is installed around the cable connection. For example, the exemplary tether linking the exoskeleton to the inner shell can be a string, cord, or small diameter cable.

Figure 2A:
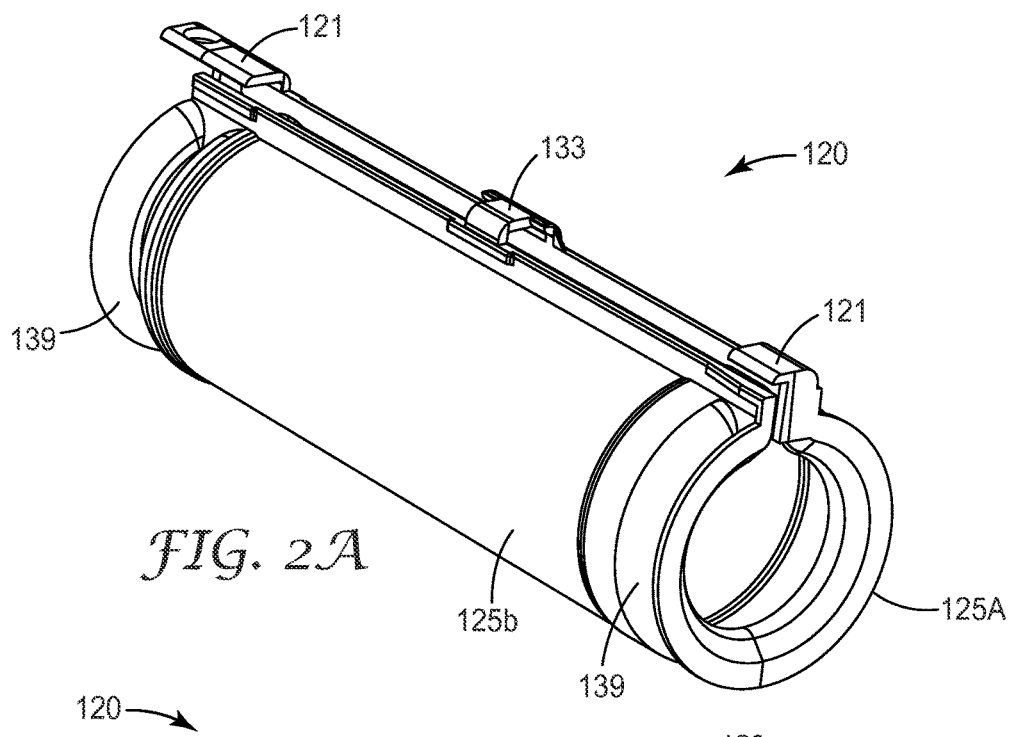
FIGS. 2A-2E show five views of an inner shell for the exemplary enclosure of FIGS. 1A and 1B.
Figure 2B:
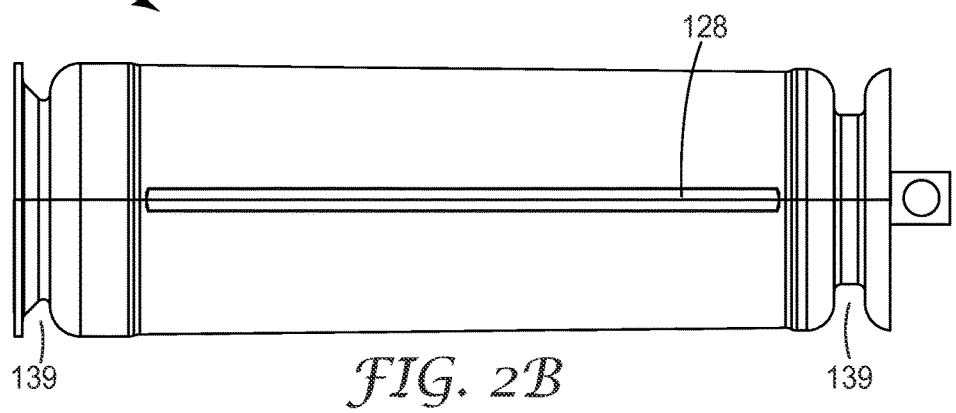
Figure 2C:
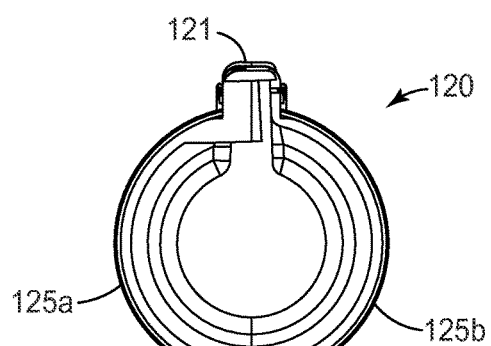
Figure 2D:
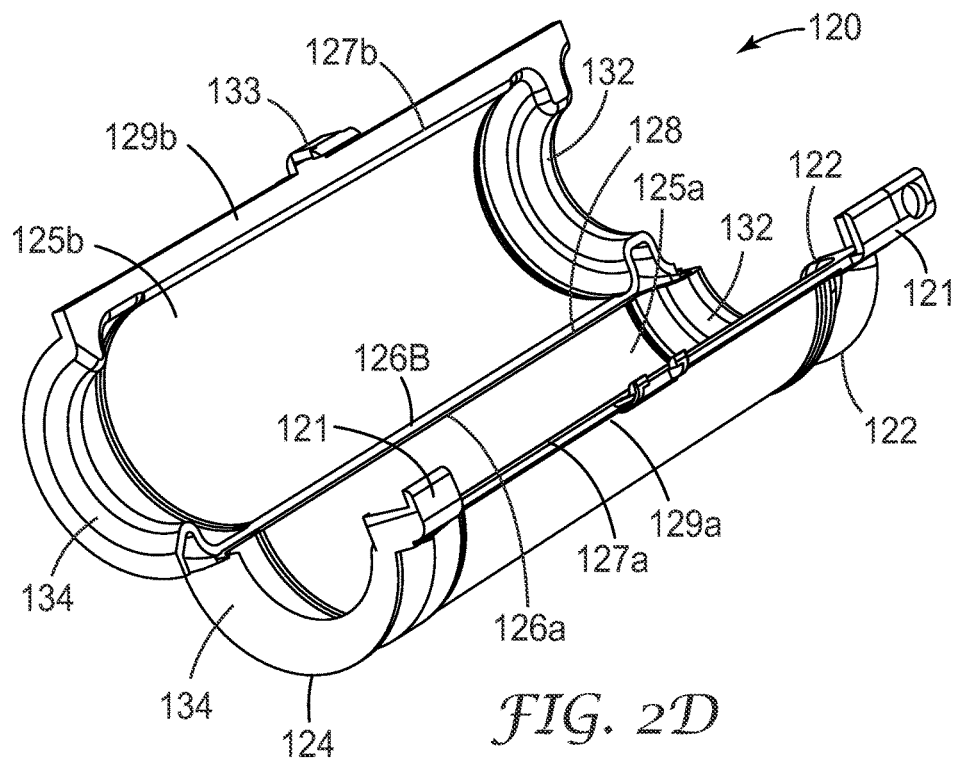
Figure 2E:
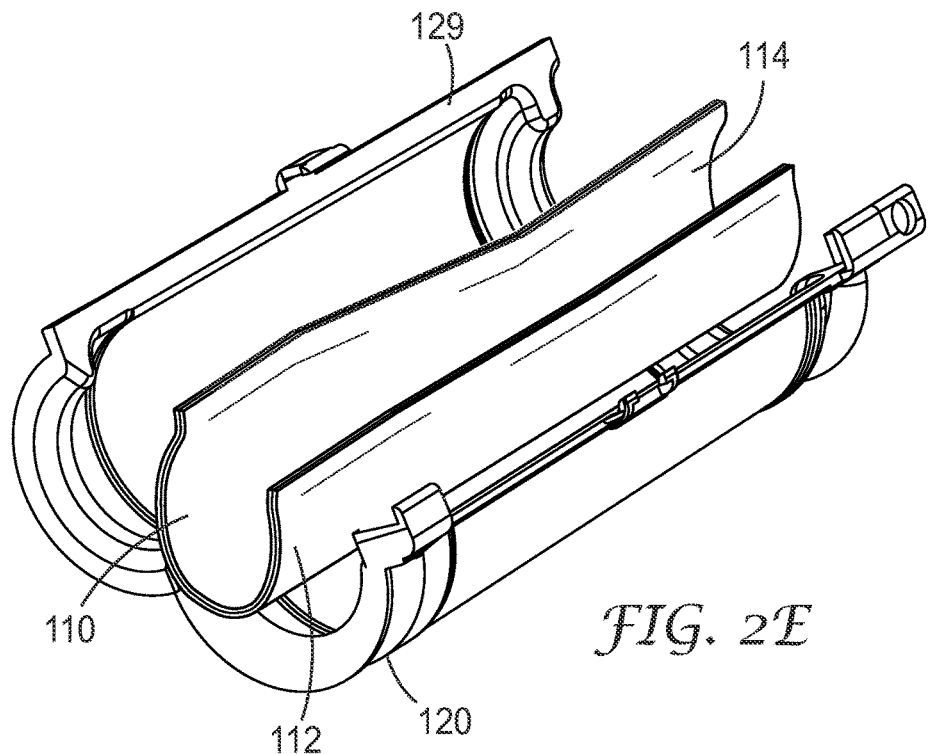

In an exemplary aspect shown in FIG. 2D, the inner shell 120 can include two shell portions 125a, 125b that can enclose a cable connection when the two shell portions are assembled together. The shell portions 125a, 125b can be connected by a hinge 128 along a first longitudinal edge 126a, 126b of each shell portion. Hinge 128 can be a living hinge or any other conventional low profile hinge structure such as a barrel hinge. Hinge 128 can extend along the entire first longitudinal edges of shell portions, or may extend along only a portion of first longitudinal edges 126a, 126b of shell portions 125a, 125b. The hinge allows the inner shell to be opened so that it can be easily placed around the cable connection and then closed to enclose the cable connection.

In another exemplary aspect, shell portions 125a, 125b can be two separate parts, each having a sealing member either disposed across their concave surface or suspended between the two shell portions. The two separate shell portions can be mated together around the cable connection to be protected and the exoskeleton portion can be snapped over the mated shell portions to lock them together while simultaneously providing a radial force compressive load to the inner shell which will ensure that the sealing member intimately contacts the cable(s) and connector thereby creating an environmental seal.

As previously mentioned, the inner shell 120 is effectively a holder for sealing member 110. The sealing member can be attached to the inner shell along the second two longitudinal edges 127a, 127b of the inner shell. In an exemplary aspect, the two longitudinal edges 127a, 127b (shown in FIG. 2D) of the inner shell include flanges 129a, 129b (shown in FIGS. 1B, 1D and 2D) that extend radially away from the central axis of the enclosure at the edge of each shell portion. Sealing member 110 can be attached to longitudinal edges 127a, 127b by an adhesive such 3M™ Adhesive Transfer Tape 9672 available from 3M Company (St. Paul, Minn.) disposed along flanges 129a, 129b. Alternatively, sealing member 110 (shown in FIG. 1D) can be attached to longitudinal edges 127a, 127b by a thermal weld, stitched connection means, or by a mechanical fastening system. Other attachment methods for attaching the sealing member 110 to the inner shell 120 include bonding, clamping, taping, stapling, and an insert molding process. In an alternative embodiment, the sealing member may be directly attached to the inner wall of the inner shell.

Inner shell 120 can include structural features that create "pressure points" at or near critical sealing locations. In FIG. 2D, the structural features are in the form of pressure ridges 132, 134 disposed at the first end 122 and the second end 124, respectively, of inner shell 120. Pressure ridges 132, 134 help ensure adequate sealing at key locations around the perimeter of cables, device receptacles or housing inlets.

Inner shell 120 can be generally cylindrical having substantially constant diameter along the entire length of the inner shell. Alternatively, the inner shell can have a continuously tapering inner shell profile, a bell-shaped inner shell profile or other mechanical design.

In another exemplary aspect, inner shell 120 can include one or more shims 121 extending from one or both of the flanges 129 which extend generally perpendicularly from the second two longitudinal edges of each shell portion 125a, 125b of inner shell 120 shown in FIGS. 2A, 2C and 2D. The shims can ensure proper positioning of the inner shell within the outer shell when the enclosure is assembled over a cable connection. In the exemplary embodiment shown in FIG. 2D, the inner shell has two shims 121 extending from flange 129a at the first end 122 and the second end 124 of the inner shell 120. When the shims are placed at the first and second ends of the inner shell in this manner, the shims provide the added advantage of providing a containment surface to concentrate the gel sealing material where it is needed to ensure an adequate level of environmental protection around the cable connection at the ends of the enclosure.

Figure 1B:
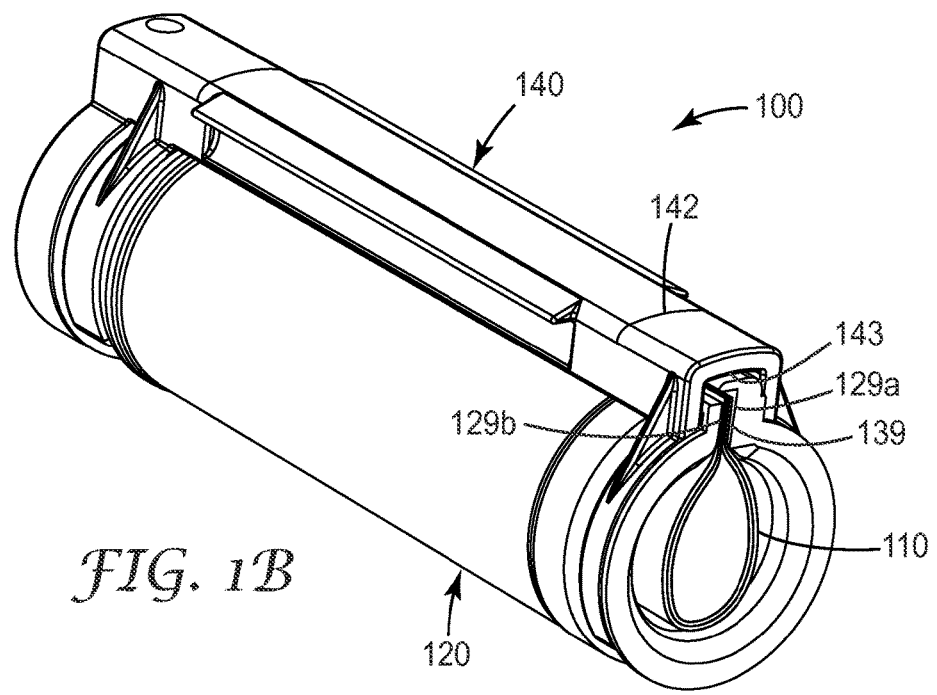
Figure 1C:
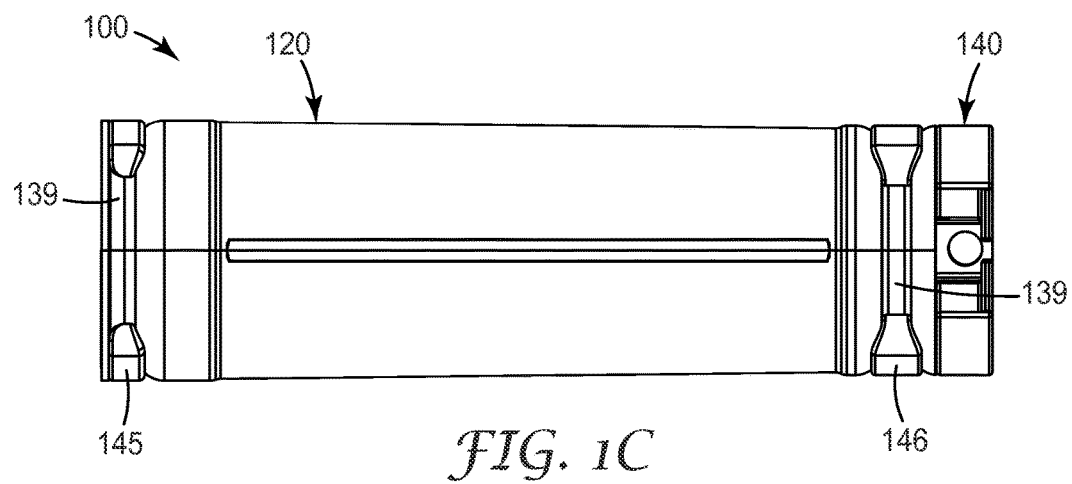
Figure 1D:
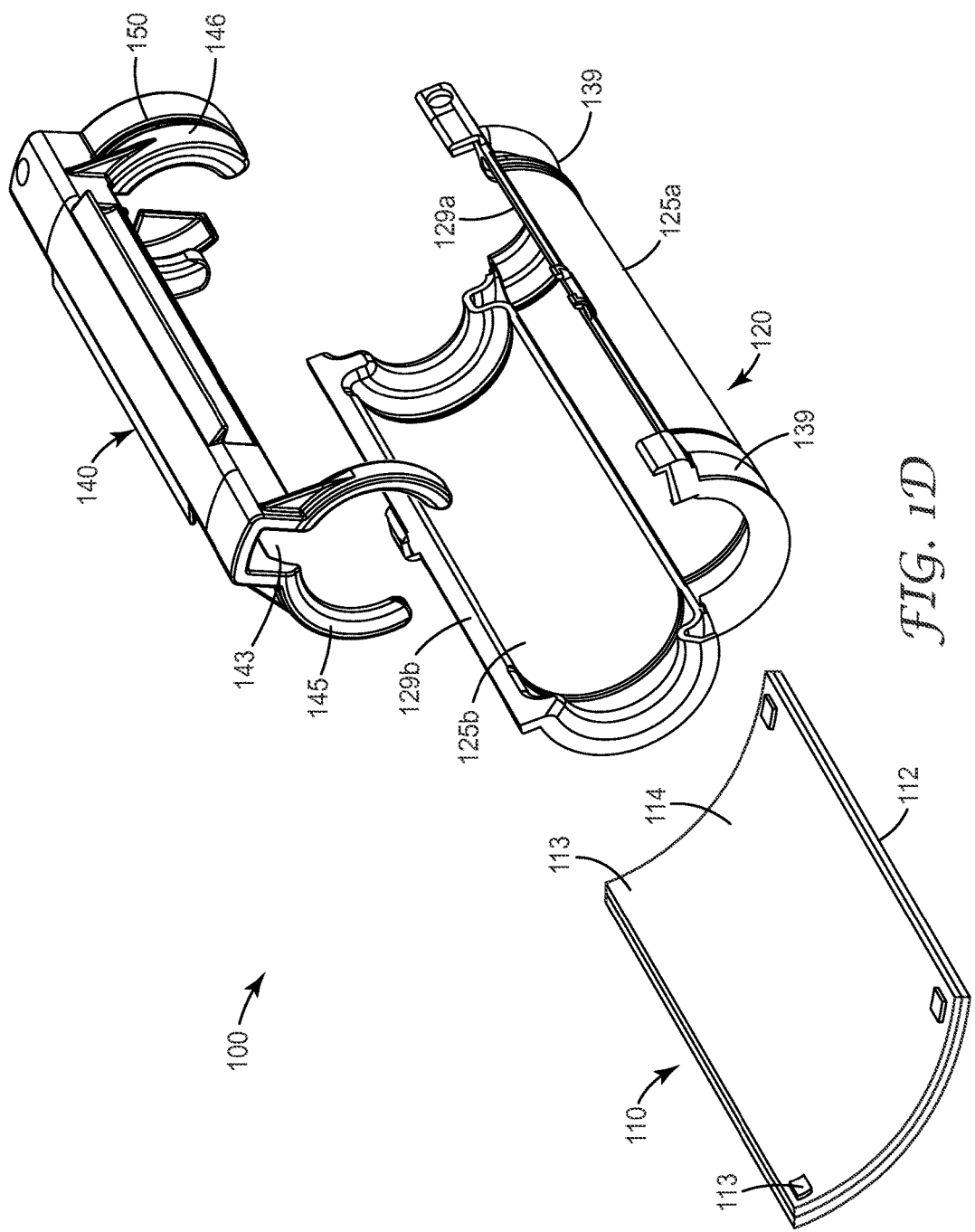

In the exemplary embodiment shown in FIG. 1D, the sealing member 110 can be a sheet sealing member 112 including a gel sealant material 114 coated on one of an elastomeric sheet and a volume compliant sheet. In an alternative aspect the sealing member can be an unsupported gel sealant material which can be directly disposed against the inner wall of the inner shell in a sufficient thickness to fill any air gaps around the cable connection being protected by the enclosure. In yet another aspect, an unsupported gel material can be provided around the perimeter of the inner shell to provide an environmental barrier at these critical locations.

Advantageously, the sheet sealing member 112 can provide mechanical integrity to sealing member 110. The sheet sealing member can be used to attach to the housing and act as a support for the softer gel sealant material 114 that forms the seal against the cable/connector/inlet surface. The sheet sealing member can be a fabric (either woven or nonwoven), an elastomeric sheet including a rubber sheet or a plastic film, a volume compliant sheet such as a closed cell and/or open cell foam sheet, or a combination thereof (e.g. a fabric backing on a rubber sheet for instance). The sheet sealing member should be a material which is compatible with the gel sealant material used in the sealing member. Exemplary materials for the sheet sealing member include neoprene, polyurethanes, silicones, as well as crosslinked polymer materials. An exemplary sheet sealing member can be a closed cell neoprene foam having a nylon fabric face on one side that is available as item number 201400BN from Perfectex plus LLC (Huntington Beach, Calif.).

The gel sealant material provides a physical barrier to the entry of environmental contaminants to the regions being protected by the gel material. Typical gel sealant materials can include oil swollen, cross-linked polymer networks. The cross-links can be either due to physical association or chemicals bonds formed between the polymer chains within the network. Exemplary oil swollen gel materials can include oil-filled thermoplastic elastomeric rubbers (e.g. styrene/rubber/styrene block copolymers), room-temperature vulcanization, (RTV) and thermoset compositions, (e.g. silicones, epoxy, urethane/isocyanates, esters, styrene-butadiene rubber (SBR), ethylene propylene diene monomer (EPDM) rubber, nitrile and butyl rubbers, etc.), and radiation cured materials including e-beam and UV/Vis radiation sensitive formulations.

One exemplary gel sealant material can comprise 70 to 95 parts by weight of mineral oil dispersed in 5 to 30 parts by weight of thermoplastic elastomer.

The term mineral oil, as used herein, refers to any of various light hydrocarbon oils, especially distillates of petroleum. Typically, the mineral oil is a white mineral oil although other mineral oils may be used. White mineral oils are generally colorless, odorless or nearly odorless, and tasteless mixtures of saturated paraffinic and naphthenic hydrocarbons that span a viscosity range of 50-650 Saybolt Universal Seconds (5 to 132 centistokes) at 100° F. (38° C.). Nearly chemically inert, white mineral oils are essentially free of nitrogen, sulfur, oxygen and aromatic hydrocarbons. Exemplary mineral oils include KAYDOL oil available from Crompton Corporation (Middlebury, Conn.), DuoPrime 350 and DuoPrime 500 available from Citgo Petroleum Corporation (Houston, Tex.), Crystal Plus 200T and Crystal Plus 500T available from STE Oil Company, Inc. (San Marcos, Tex.). Typically, 70 to 95 parts by weight of mineral oil, or even more typically 85 to 93 parts by weight of mineral oil are used in combination with 7 to 15 parts by weight of the at least one thermoplastic elastomer.

In an alternative embodiment, the mineral oil can be replaced fully or in part by another petroleum based oil, a vegetable oil, or a modified version of either of these two oil types.

Suitable thermoplastic elastomers for use in sealant material include styrene-rubber-styrene (SRS) triblock copolymers, styrene-rubber (SR) diblock copolymers, styrene-rubber-styrene (SRS) Star copolymers and mixtures thereof. Exemplary styrene-rubber-styrene triblock copolymers include styrene-butadiene-styrene (SBS), styrene-isoprene-styrene (SIS), and partially or completely hydrogenated derivatives thereof, such as styrene-ethylene/butylene-styrene (SEBS), styrene-ethylene/propylene-styrene (SEPS), styrene-ethylene/ethylene/propylene-styrene (SEEPS), and combinations thereof. Examples of commercially available suitable SEBS block copolymers for use in the exemplary sealant material include trade designated "KRATON G-1651" and "KRATON G-1633" Block Copolymers, both of which are commercially available from Kraton Polymers (Houston, Tex.). Examples of commercially available suitable SR diblock copolymers include trade designated "KRATON G-1701" and "KRATON G-1702" Block Copolymers both of which are commercially available from Kraton Polymers (Houston, Tex.), and "SEPTON S 1020" High Performance Thermoplastic Rubber which is commercially available from Kuraray Company (Tokyo, Japan). Exemplary suitable SEPS and SEEPS block copolymers for use in the exemplary sealant material include trade designated "SEPTON S 4055" or "SEPTON S 4077" High Performance Thermoplastic Rubber which are commercially available from Kuraray Company (Tokyo, Japan). An exemplary SRS star copolymer is "SEPTON KL-J3341" also available from Kuraray Company (Tokyo, Japan). Additionally, suitable vinyl-rich block copolymers for use in the exemplary sealant material include "HYBRAR 7125" and "HYBRAR 7311" High Performance Thermoplastic Rubbers, which are also commercially available from Kuraray Company (Tokyo, Japan). A suitable maximum concentration of the block copolymer in the gel sealant material is about 30% by weight, based on the entire weight of gel sealant material.

Other additives which may be added to the exemplary gel sealing material of the current invention can include cure catalysts, stabilizers, antioxidants, biocides, colorants (e.g. carbon black, talc, other pigments, or dyes), thermally conductive fillers, radiation absorbers, flame retardants, etc. Suitable stabilizers and antioxidants include phenols, phosphites, phosphorites, thiosynergists, amines, benzoates, and combinations thereof. Suitable commercially available phenolic-based antioxidants include trade designated "IRGANOX 1035", "IRGANOX 1010", and "IRGANOX 1076" Antioxidants and Heat Stabilizers for wire and cable applications, commercially available from Ciba Specialty Chemicals Corp. (Tarrytown, N.Y.) and vitamin E based antioxidants such as α-tochopherol, commercially available from Sigma-Aldritch (St. Louis, Mo.). A suitable maximum concentration of stabilizers or antioxidants in the gel sealant material is about 1% by weight, based on the entire weight of the gel sealant material. When forming the gel sealant material, stabilizers and antioxidants may be dissolved or dispersed in the mineral oil prior to combining the diblock copolymer with the mineral oil.

The gel sealant material can be melted and coated onto the fabric-faced neoprene sheet (item number 201400BN available from Perfectex plus LLC, Huntington Beach, Calif.). In one exemplary aspect, the gel sealant is a mixture of 5% Kraton G1633 in Kaydol oil, with 0.2% Irganox 1010 antioxidant. The sealant material can be melted in a hot melt dispenser that has a reservoir temperature of about 170° C. to about 180° C. The melted sealant material is dispensed onto the sheet sealing member and coated to the desired thickness via a standard knife coating technique. Alternatively, extrusion overcoating, or other standard hot melt coating techniques may be used. The resulting sheets of material can be cut to the desired size after the sheet sealing member has been coated with the gel sealant material. In an alternative aspect, the sheet sealing member can be cut to size prior to application of the gel sealant material. In one alternative method, the cut sheet of the sheet sealing member can be inserted into a mold and the gel sealant material can be injected under pressure.

In an alternative aspect, the gel sealant is a mixture of 9% Kraton G1651 in Kaydol oil with 0.2% Irganox 1010 antioxidant and a trace amount (0.002%) of Raven 660R Carbon Black available from Columbian Chemicals Company (Marietta, Ga.). In another alternative aspect, the gel sealant is a mixture of about 5% Septon S4055 in Kaydol oil with 0.2% Irganox 1010 antioxidant and a trace amount (0.002%) of Raven 660R Carbon Black. In another alternative aspect, the gel sealant is a mixture of about 9% Kraton G1651 in Crystal Plus 500T oil, with 0.2% Irganox 1010 antioxidant Raven 1200 Carbon Black available from Columbian Chemicals Company (Marietta, Ga.). In another alternative aspect, the gel sealant is a mixture of about 5% Kraton G1633 in Crystal Plus 500T oil, with 0.2% Irganox 1010 antioxidant. While in another alternative aspect, the gel sealant is a mixture of about 5% Septon S4055 in Crystal Plus 350T oil, with 0.2% Irganox 1010 antioxidant and a trace amount (0.002%) of Raven 660R Carbon Black. While yet another alternative gel sealant mixture includes of about 9% Septon S4077 in Crystal Plus 350T oil, with 0.2% Irganox 1010 antioxidant. Another exemplary gel sealant mixture includes 90.8% DuoPrime 500, 9% Kraton G1651 and 0.2% α-tochopherol. Yet another exemplary gel sealant mixture includes 90.5% DuoPrime 500, 9% Kraton G1651 and 0.5% α-tochopherol. It should be noted that the optimal process conditions of the gel sealant material may change based on the selected formulation, but should be easily derivable from the material properties and through routine experimentation.

The gel sealant material can be coated in to yield a final thickness of the gel sealant material of about 1 mm to about 5 mm thick on the sheet sealing member. In an exemplary aspect, the gel sealant material can be coated in an approximately 3 mm thick layer on the neoprene. The thickness of the gel sealant materials can be altered depending on the configuration of the enclosure and cable connection to be protected. In one exemplary aspect, the gel sealant material can be uniformly coated on the sheet sealing member. In an alternative aspect, sealing member 110 can include gel nubs or ridges which extend from the exposed surface of the gel sealant material. The gel nubs provide an extra amount of gel in critical sealing regions such as the exposed triple points where the two surfaces of the gel sealant material contact each other and the surface of the cable connection at either end of the exemplary enclosure. In an alternative aspect, the sealing material can have a gel ridge (not shown) extending along each longitudinal edge of the sealing member to provide an extra amount of gel along the longitudinal seam 139 (FIG. 1B) of the sealing member when it is closed around a cable connection. In another alternative embodiment, the sealing member can have a depression or reduced thickness of gel sealant material in non-critical sealing regions. In some embodiments, the non critical sealing regions may be covered by little to no gel which can result in a decrease in the size (i.e. diameter) and weight of the exemplary enclosures to enabling an even higher density of cable connections.

Figure 3A:
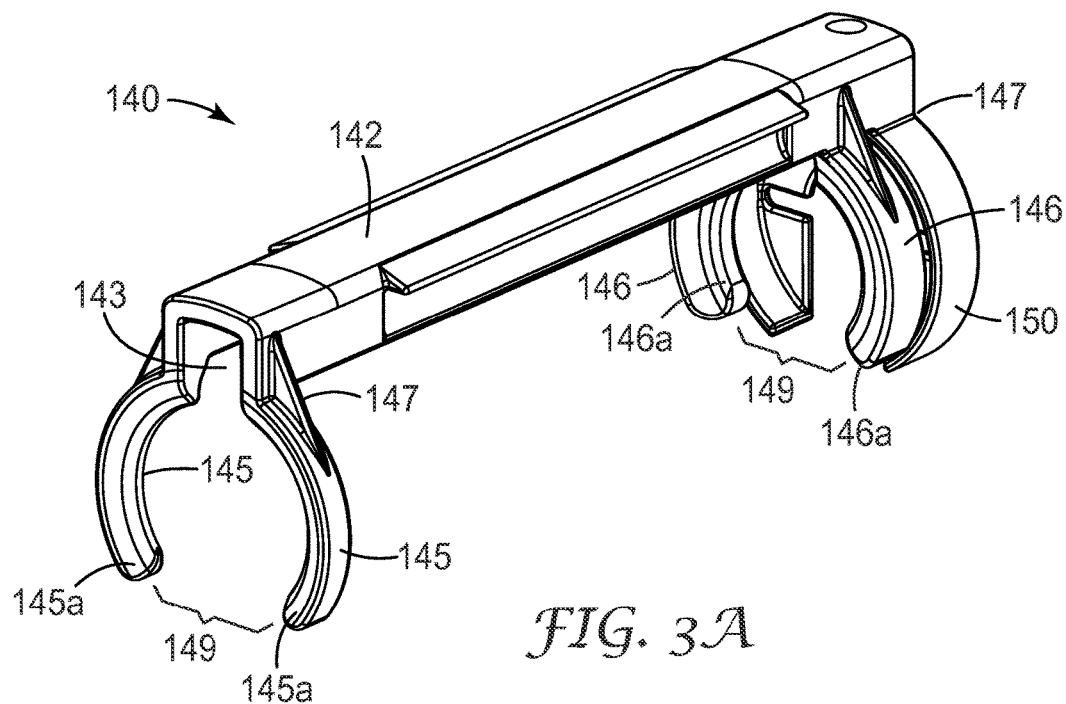
FIGS. 3A and 3B are two views of an exoskeleton for the exemplary enclosure of FIGS. 1A-1D.
Figure 3B:
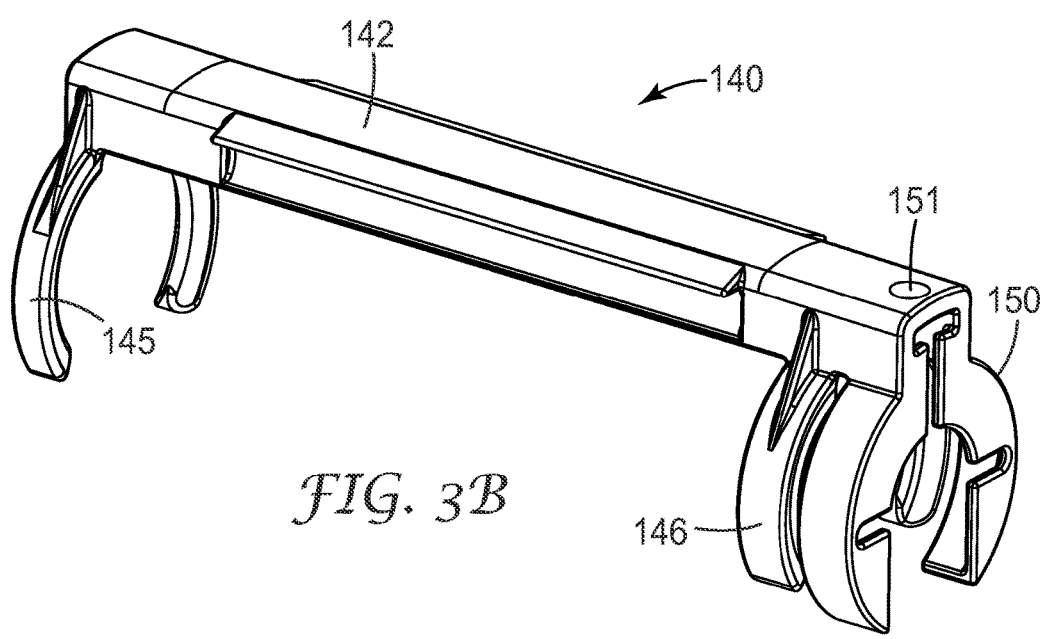

The exoskeleton 140 of the enclosure is shown in detail in FIGS. 3A and 3B. The exoskeleton imparts a radial compressive load to at least a portion of the inner shell. To accomplish this, the arcuate ribs 145, 146 extending from the spine 142 of the exoskeleton closely fit over at least a portion the inner shell. Each of the arcuate ribs 145, 146 extend from and anchored end where each rib is attached to the spine to a free end 145a, 146a spaced apart from the spine, as shown in FIG. 3A. In an exemplary aspect, the arcuate ribs are paired as a set of two opposing arcuate ribs on transverse sides of the exoskeleton's spine. There is a gap 149 between free ends of paired arcuate ribs opposite the spine of the exoskeleton. The gap allows for exoskeleton to be attached to the outer shell in a direction that is transverse to the central axis of the enclosure.

The inner shell can include one or more guides 139 formed in the surface of the inner shell to ensure proper positioning of the arcuate ribs as shown in FIGS. 1C, 2A and 2B. In an exemplary aspect, the arcuate ribs of the exoskeleton are positioned near the critical sealing regions of the enclosure. The arcuate ribs are configured to closely fit over the inner shell at these critical regions to provide a controlled and constant radial compressive force to the inner shell to ensure an environmental seal around the cable connection housed in enclosure 100. Exoskeleton 140 can be made of a semi-rigid or rigid material such as an engineering resin material.

Referring to FIGS. 1B, 2D and 3A, the spine 142 of the exoskeleton 140 can include channel 143 on the underside of the spine that is configured to accept flanges 129a, 129b of the inner shell and to apply a compression force to the flanges so that the sealing member is compressed by a sufficient amount to ensure an environmental seal along the seam 139 formed coming together of the two edges of the sealing member attached to the longitudinal edges 127a, 127b of the inner shell.

In another exemplary aspect, the exoskeleton can include an ultraviolet screen 150 attached to at least one terminal end of the spine of the exoskeleton to minimize ultraviolet exposure of the sheet sealing member. The ultraviolet screen can provide additional environmental protection, serving as a physical barrier to driving rain and the like. In addition the ultraviolet screen helps reinforce and strengthen the exoskeleton, restricts cable movement or sideways sway within the enclosure. The exoskeleton can include an opening 151 disposed therein to enable securing of the exoskeleton to the inner shell via a cable tie or another mechanical fastener such as a pin.

In one exemplary aspect, sealing member 110 is compressed from about 20% to about 65% at critical points in the enclosure, such as around the perimeter of the cable near the first and second ends of the enclosure and along the longitudinal seam of the inner shell between flanges 129a, 129b. In an alternative aspect, the gel sealant material is compressed from about 40% to about 50%.

In an exemplary aspect, the exoskeleton 140 can include one or more braces 147 disposed between the spine 142 and the arcuate ribs 145, 146 to reinforce the exoskeleton and help control the deflection of the arcuate ribs.

Inner shell 120 and exoskeleton 140 can be made by various processes, for example, injection molding, blow molding, spin molding, extrusion molding, vacuum molding, rotational molding, and thermal forming. Embodiments of the inner shell and exoskeleton can be made from various materials, for example, aluminum, steel, metal alloys, and plastics, particularly injection molded thermoplastics, such as polyolefins, polyamides, polycarbonates, polyesters, polyvinyls, and other polymeric materials. Typical thermoplastics materials usable for the inner shell include polyamides (Nylon® 12, Nylon® 6,6, etc), polyolefins (for example, polyethylene (PE), polypropylene (PP) such as Slovalen PH91N available from Plastcom (Hallalova, Bratislava, Slovak Republic), Profax 8523 available from LyondellBasel (Rotterdam, Netherlands), and Borsoft SG220MO available from *Borealis* (Linz, Austria), and polybutylene (PB)), vinyl acetate, poly ethers, polysulfones, polystyrenes, polyvinylchloride (PVC), and copolymers and blends thereof. Typical materials usable for the outer shell include filled and unfilled thermoplastic and thermoset materials, including polyolefins (for example, polyethylene (PE), polypropylene (PP) and polybutylene (PB)), vinyl acetate, polycarbonate, poly ethers, polysulfones, polystyrenes, PVC, diene rubbers, acrylonitrile butadiene styrene (ABS), polyamides, polybutadiene, polyether block amide (PEBA), polyetherimide, polyimide, polyurea, polyurethane (PUR), silicone, vinyl ester resins, phenolic resins, melamine and urea formaldehyde resins, fluorinated resins (e.g. PTFE) PEEK, polyesters, (polybutylphthalate, PET, etc.) and copolymers and blends thereof. Exemplary polycarbonate/polybutylphthalate blends that can be used to make the exoskeleton are Xenoy x4820 or Valox® 533 which are available from SABIC Innovative Plastics (Pittsfield, Mass.). In an alternative aspect, the exoskeleton can be made of a polyetherimide resin such as Ultem 1010 polyetherimide available from SABIC Innovative Plastics (Pittsfield, Mass.). In yet another exemplary aspect, the exoskeleton can be made of a semi-crystalline thermoplastic polyester such as Ertalyte® PET-P available from Quadrant (Johannesburg, South Africa).

FIG. 4 shows a plurality of exemplary enclosures 100A-100C disposed around a plurality of closely space parallel cable connections. In particular each of the cable connections being protected by the exemplary enclosure can be a connection between a cable 10A-10C and a receptacle 70A-70C in the wall (not shown) of a housing. The cable connection is positioned in one of the shell portion 125a, 125b of inner shell 120 and pressed against sealing member 110. The other shell portion is rotated about the pivot axis of hinge 128 to close the inner shell around the cable connection forming a seam 139 between the flanges of the inner shell. A temporary securing device or clasp 133 (FIGS. 2A and 2D) can be attached to one of the flanges 129a, 129b of inner shell 120 to keep the inner shell closed until the exoskeleton can be positioned over the inner shell. This is especially advantageous in high density cable connection installations in which it may be desirable to place the inner shell around all of the adjacent cable connections before positioning the exoskeletons over their respective inner shells to complete the assembly of the enclosures.

The exoskeleton 140 can be attached over the inner shell by pushing the exoskeleton in a direction that is substantially perpendicular to the central axis of the enclosure so that the inner shell moves through the gap formed between free ends of paired arcuate ribs opposite the spine of the exoskeleton. The arcuate ribs deflect a sufficient amount to allow the inner shell to pass through the gap and spring back into their original shape to securely hold the inner shell and apply a compressive force to the inner shell at the critical sealing regions of the enclosure (i.e. along the seam and at the first and second ends of the enclosure.

The exoskeleton can be removed by applying a removal force to the spine of the exoskeleton in a direction away from the central axis of the enclosure. The free ends of the arcuate ribs deflect outward to allow the inner shell to pass through the gap between the free ends of the arcuate ribs. Once the inner shell has been withdrawn from the exoskeleton, the inner shell can be opened to reveal the cable connection for inspection and/or maintenance.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An enclosure for protecting a cable connection, the enclosure comprising:
    an inner shell having a central axis,
    an unsupported sheet sealing member attached along two longitudinal edges of the inner shell and
    a rigid exoskeleton that is configured to snap onto the inner shell in a direction transverse to the central axis to secure the enclosure around the cable connection, wherein the exoskeleton comprises pairs of arcuate ribs extending from a central spine, wherein the arcuate ribs apply a compressive force to the inner shell when the enclosure is assembled.

2. The enclosure of claim 1, wherein inner shell is composed of two shell portions.

3. The enclosure of claim 1, wherein the shell portions are connected by a hinge along one longitudinal edge of each shell portion.

4. The enclosure of claim 1, wherein the each of the two longitudinal edges of the inner shell includes a flange that extend radially away from the central axis of the enclosure at the edge of each of the shell portions and wherein the sheet sealing member attached each flange.

5. The enclosure of claim 4, wherein the exoskeleton comprises a channel formed in an underside of the spine that is configured to accept the flanges of the inner shell and to apply a compression force to the flanges so that the sheet sealing member is compressed between the flanges.

6. The enclosure of claim 1, wherein the inner shell further comprises one or more guides disposed in an outer surface of the inner shell to ensure the proper position of the arcuate ribs when the exoskeleton is mounted onto the inner shell.

7. The enclosure of claim 1, further comprising at least one temporary securing device extending from at least one of the two longitudinal edges to close the inner shell prior mounting the exoskeleton over the inner shell.

8. The enclosure of claim 1, wherein the sheet sealing member comprises a gel sealant material coated on one of an elastomeric sheet and a volume compliant sheet.

9. The enclosure of claim 8, wherein the gel sealant material comprises an oil swollen, cross-linked polymer network.

10. The enclosure of claim 8, wherein the sheet sealing member can include gel nubs extending from an exposed surface of the gel sealant material.

11. The enclosure of claim 8, wherein the sheet sealing member can include a reduced thickness of the gel sealant material in non-critical sealing regions.

12. The enclosure of claim 1, further comprising a tether connecting the inner shell to the exoskeleton.

13. An enclosure for protecting a cable connection, the enclosure comprising:
    an inner shell having a central axis,
    an unsupported sheet sealing member attached along two longitudinal edges of the inner shell and
    a rigid exoskeleton that is configured to snap onto the inner shell in a direction transverse to the central axis to secure the enclosure around the cable connection, wherein the exoskeleton comprises pairs of arcuate ribs extending from a central spine, wherein the arcuate ribs apply a compressive force to the inner shell when the enclosure is assembled, and wherein the exoskeleton further comprises an ultraviolet screen attached to at least one terminal end of the spine of the exoskeleton to minimize ultraviolet exposure of the sheet sealing member.

14. The enclosure of claim 13, wherein inner shell is composed of two shell portions, wherein the shell portions are connected by a hinge along one longitudinal edge of each shell portion.

15. The enclosure of claim 13, wherein the each of the two longitudinal edges of the inner shell includes a flange that extend radially away from the central axis of the enclosure at the edge of each of the shell portions and wherein the sheet sealing member attached each flange.

16. The enclosure of claim 15, wherein the exoskeleton comprises a channel formed in an underside of the spine that is configured to accept the flanges of the inner shell and to apply a compression force to the flanges so that the sheet sealing member is compressed between the flanges.

17. The enclosure of claim 13, wherein the inner shell further comprises one or more guides disposed in an outer surface of the inner shell to ensure the proper position of the arcuate ribs when the exoskeleton is mounted onto the inner shell.

18. The enclosure of claim 13, wherein the sheet sealing member comprises a gel sealant material coated on one of an elastomeric sheet and a volume compliant sheet, wherein the gel sealant material comprises an oil swollen, cross-linked polymer network.

19. The enclosure of claim 13, wherein the sheet sealing member can include gel nubs extending from an exposed surface of the gel sealant material.

20. The enclosure of claim 13, wherein the sheet sealing member can include a reduced thickness of the gel sealant material in non-critical sealing regions.

\* \* \* \* \*

UNITED STATES PATENT AND TRADEMARK OFFICE
CERTIFICATE OF CORRECTION

PATENT NO. : 9,831,655 B2
APPLICATION NO. : 15/105624
DATED : November 28, 2017
INVENTOR(S) : David Dupuis Page 1 of 1

It is certified that error appears in the above-identified patent and that said Letters Patent is hereby corrected as shown below:

Column 2
Line 4, before "enclosure" delete "HI".

Signed and Sealed this
Twenty-second Day of May, 2018

Andrei Iancu
*Director of the United States Patent and Trademark Office*